May 12, 1931.  J. H. SCHWEER  1,805,420
TUBE HOLDER
Filed June 29, 1929
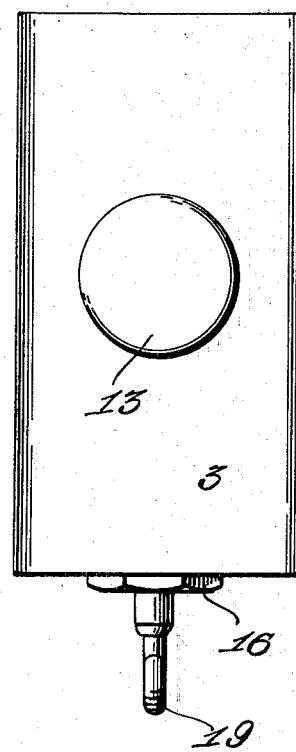
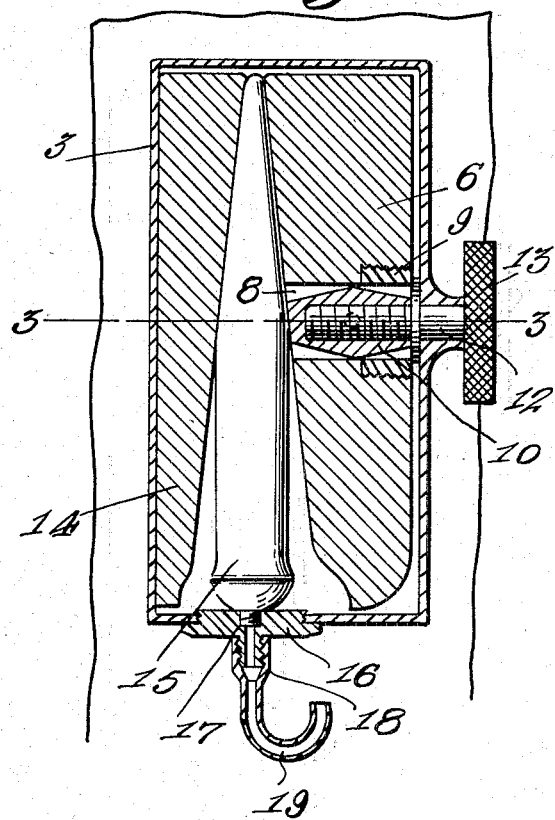
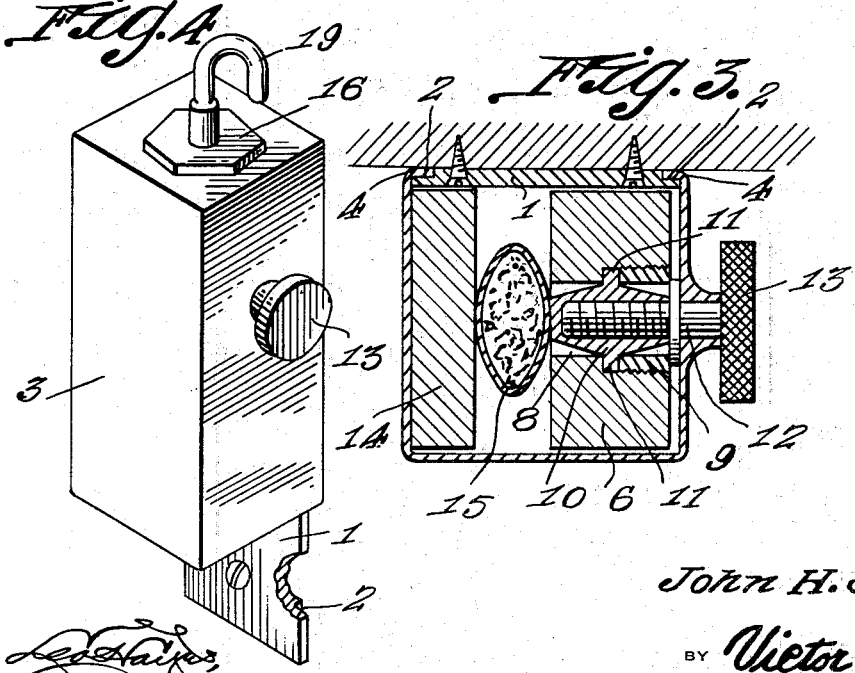
John H. Schweer, INVENTOR
BY Victor J. Evans, ATTORNEY Patented May 12, 1931

1,805,420

UNITED STATES PATENT OFFICE

JOHN HENRY SCHWEER, OF LONG BEACH, CALIFORNIA

TUBE HOLDER

Application filed June 29, 1929. Serial No. 374,745.

This invention relates to a holder for a tube containing paste, the general object of the invention being to provide a casing containing a pair of jaw members between which the tube is placed, with means for moving one jaw member so as to eject a part of the contents of the tube therefrom.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a side view of the device.

Figure 2 is a longitudinal sectional view.

Figure 3 is a section on line 3—3 of Figure 2.

Figure 4 is a perspective view showing the device reversed to place the discharge at the top.

In these views, the numeral 1 indicates a plate which is adapted to be fastened to a wall or other support, the plate having the grooves 2 in its side edges. The numeral 3 indicates a casing which is formed with the flanges 4 at one side thereof which are adapted to engage the grooves so that the casing can be slid over the plate, the closed upper end of the casing acting as a stop for limiting the downward movement thereof on the plate. A movable jaw 6 is placed in the casing and is formed with an opening 8, the outer part of which is enlarged and threaded to receive a bushing 9 and a nut 10 is placed in the opening and has a pair of trunnions 11 thereon which are rotatably held in bearing openings formed in the walls of the opening 8 by the bushing 9. The nut tapers toward each end from its center so that it has rocking movement in the opening 8. The nut is engaged by the threaded shaft 12 carried by one side of the casing, the outer end of the shaft having a knurled disk 13 thereon whereby it can be turned. A jaw 14 is also located in the casing and the jaws have beveled adjacent faces so that a tube 15 can be placed in the casing between the two jaws. The lower end of the casing has an opening therein for receiving the threaded part of an adapter 16 which has a centrally arranged hole 17 therein, a part of which is threaded to receive the threaded neck of the tube. A nipple 18 is formed on the adapter 16 and receives the material passing through the opening 17. A number of these adapters can be provided so that the device can be used with different sizes of tubes.

From the foregoing it will be seen that the tube can be placed in the device by removing the member 16 from the casing and passing the tube through the opening left thereby, the tube fitting in the space between the jaws. Then by turning the shaft 12 to impart movement to the nut, the jaw 6 is moved toward the jaw 14 so that pressure is applied to the tube and thus a part of its contents will be ejected through the nipple 18. The formation of the jaws permits the upper parts of the jaws to first engage the upper end of the tube to press the material therefrom and when the material has been pressed from said upper end of the tube, the jaw 6 will engage a lower portion of the tube to press the material therefrom and finally the lower part of the jaw will engage the lower part of the tube so that finally all the material or paste is pressed from the tube. Of course, a cap or stopper is provided for closing the end of the nipple or of the goose-neck when the device is not in use.

With this device, it is simply necessary to place the brush under the nipple and if it is desired to reverse the device to place the nipple uppermost, as in Figure 4, the gooseneck 19 can be placed over the nipple so that the paste will be ejected in a downward direction.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a casing, a pair of jaws arranged in the casing and having their adjacent faces tapering to form a wedge shaped space between them to receive a paste tube, one jaw member having a centrally arranged transverse opening therein, a nut tapering from its center to each end for fitting in the opening, trunnions on the nut, bearing means in the walls of the opening for receiving the trunnions, said nut having a threaded socket therein, a screw shaft rotatably arranged in one side of the casing and having a threaded part engaging the socket, a handle on the outer end of the shaft and discharge means at one end of the casing through which the paste forced from the tube by the jaws will pass.

In testimony whereof I affix my signature.

JOHN HENRY SCHWEER.